No. 816,155. PATENTED MAR. 27, 1906.
M. DEAN.
JOINT FOR PIPES.
APPLICATION FILED DEC. 14, 1903.
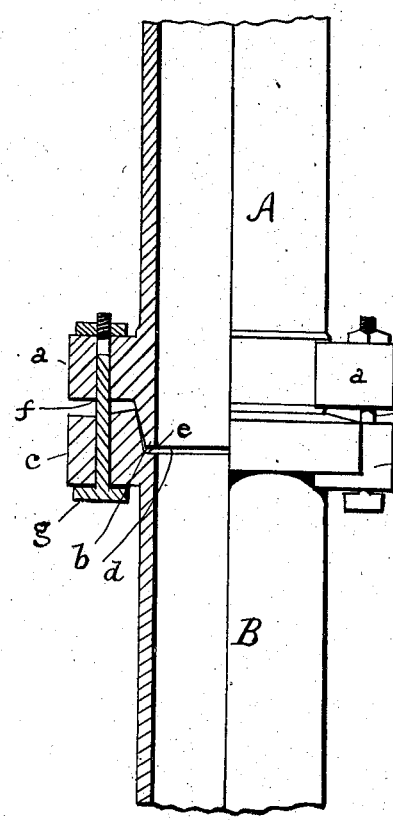
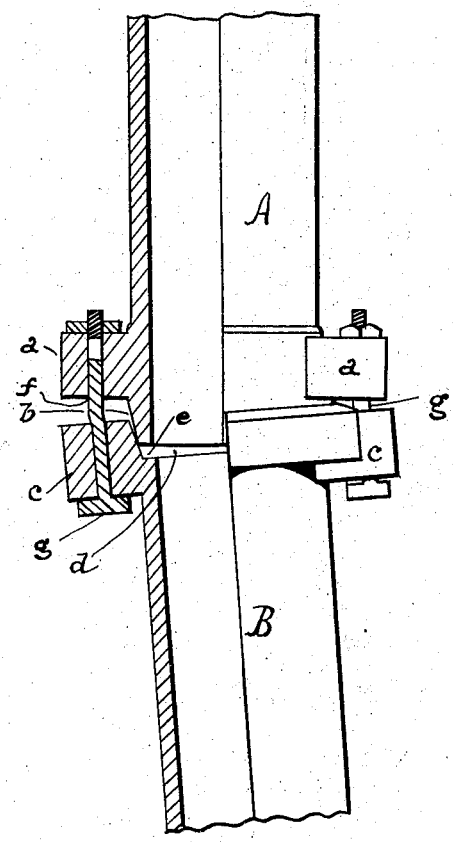
WITNESSES:
Anna H. Van Horenberg
Lawrence E. Fuentes
Mark Dean INVENTOR
BY W. P. Preble Jr.
his ATTORNEY

UNITED STATES PATENT OFFICE.

MARK DEAN, OF EAST ORANGE, NEW JERSEY.

JOINT FOR PIPES.

No. 816,155.     Specification of Letters Patent.     Patented March 27, 1906.

Application filed December 14, 1903. Serial No. 185,070.

*To all whom it may concern:*

Be it known that I, MARK DEAN, a citizen of the United States, and a resident of East Orange, county of Essex, State of New Jersey, have invented certain new and useful Improvements in Joints for Pipes, of which the following is a specification.

The object of my invention is to provide a new joint for pipes, and more particularly for cast-iron pipes, such as are used in underground work and in plumbing generally, where it is desirable to allow for variations from the straight line in which the pipes are set.

Sometimes from the nature of the walls in which the pipes are set it is desirable to make a slight variation from a straight line in a continuous stretch of piping; but my invention has more particularly in view the protection of the joint against leakage where the variation or deflection is caused by underground settling. To this end I construct successive lengths of pipe, so that each joint is formed by the meeting of an external taper on the end of one pipe and an internal taper on the end of the other pipe. In order to make a joint of this character a perfect joint which will stand many hundred pounds of pressure both in an absolutely straight or continuous position and when one of the pipes is somewhat deflected from the longitudinal axis of the other, I have found that the external taper should be somewhat larger in circumference than the internal and that the pitch should be slightly greater in the internal taper than the external taper. It is also an advantage when cast-iron pipe is employed to have the tapered surfaces machined, as also the shoulders adjacent to the taper on both ends of piping, as thereby a clean-cut surface is always available to effect a joint.

One form of my invention is shown in the accompanying drawings, in which—

Figure 1 is a longitudinal view, partly in section, of two pipes set in strict alinement with each other. Fig. 2 is a similar view, the two pipes being somewhat deflected from each other.

Same letters indicate similar parts in both the figures.

A is a length of pipe provided with a number of projecting lugs $a$, preferably two in number, near the end of the pipe and terminating in a slight tapering edge $b$ beyond the lugs. B is another pipe end provided with similar lugs $c$. The end of the pipe has a recess $d$, the sides of which taper slightly and with an annular shoulder $e$. The lugs $a$ $a$ are provided with bolt-holes $f$, by which the two pipe ends may be secured together by the bolts $g$.

The external tapering surface of the pipe A is slightly larger in circumference than the internal tapering surface of the pipe B, so that when the pipe ends are drawn together in direct alinement by the bolts $g$ complete and effective contact takes place without allowing the extreme edge of the pipe A to come up against the bottom of the recess in the pipe B. The pitch of the recess is slightly greater than that of the entering pipe A, so as to allow a small amount of play, which is essential when a perfect joint has to be made with the pipes deflected from direct alinement, as shown in Fig. 2. Both tapers should be straight, as shown, as a rounded surface interferes with a perfect joint.

It is desirable that both tapering surfaces and also the annular shoulder of the recess, the extreme end of the pipe A, and a small portion of the surface of the lugs should be machined, so that the angles made by the taper with the pipe-surface and the lug-surface should have sharp and true edges, so that wherever contact is made by one of these edges on one pipe with one of the surfaces on the other a tight joint results.

The opposed edges of the lugs may be parallel, but are preferably of different angles, so as to allow room for the deflection of the pipe, although under ordinary circumstances the fact that the lugs are not drawn into contact with each other gives sufficient play.

Although described as applied to a pipe provided with projecting lugs, the same principle would be involved if the pipes were flanged with annular flanges.

I claim—

A joint for pipes which consists of two pipe ends, one of which has a straight tapering end and the other of which is provided with an internal annular recess with straight tapering sides; the taper of the recess being of smaller diameter and of greater pitch than the taper of the entering pipe end.

MARK DEAN.

Witnesses:
O. W. MCCONNELL,
W. P. PREBLE, Jr.